C. A. HIRTH.
MEASURING TOOL.
APPLICATION FILED JAN. 14, 1913.
1,162,720.
Patented Nov. 30, 1915.
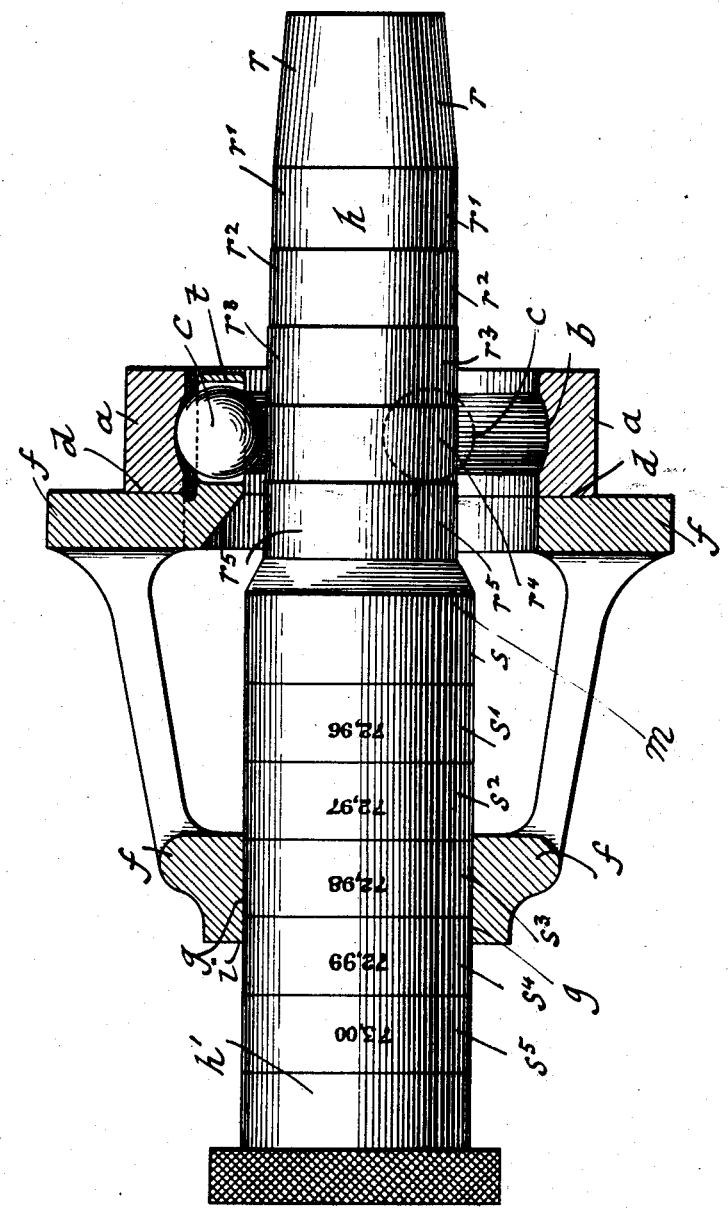

UNITED STATES PATENT OFFICE.

CARL ALBERT HIRTH, OF CANNSTATT-STUTTGART, GERMANY, ASSIGNOR TO FORTUNA WERKE ALBERT HIRTH, OF CANNSTATT-STUTTGART, GERMANY, A CORPORATION OF GERMANY.

MEASURING-TOOL.

1,162,720.  Specification of Letters Patent.  Patented Nov. 30, 1915.

Application filed January 14, 1913. Serial No. 741,952.

*To all whom it may concern:*

Be it known that I, CARL ALBERT HIRTH, a citizen of the German Empire, residing in Cannstatt-Stuttgart, in the Kingdom of Wurttemberg, in said Empire, have invented certain new and useful Improvements in Measuring-Tools, of which the following is a specification.

This invention relates to an improved meansuring tool for accurately determining the diameter of hollow bodies or bores in which contact-bodies, such as balls, are employed and held in contact with the object the interior diameter of which is to be measured.

Measuring tools for accurately determining the interior diameter of bodies, which are provided with balls as intermediate contact-bodies, and into which a conically-tapering mandrel is inserted, were used heretofore. The size of the axial shifting motion of the mandrel was read off on a scale which was arranged on the mandrel, by means of an index-point or a reading-off edge on the supporting frame, and thereby the diameter of the hollow object to be measured ascertained. In measuring tools of this kind, the diameter to be determined was heretofore obtained in a fairly accurate manner by the axial shifting of the mandrel, but the measurements were not very reliable inasmuch as the shifting of the mandrel could not be read off with sufficient clearness and exactitude from the graduation-lines of the scale, inasmuch as the latter were covered to some extent by the reading-off edge of the frame. The unavoidable separating space which was formed between the mandrel and the reading-off edge affected likewise the reading off of the measurement and formed another objection to the measuring tools heretofore in use.

The object of this invention is to improve the measuring tools referred to in such a manner that by a new shape of the mandrel the reliable and accurate reading off of the measurements, even by persons not experienced in making them, is obtained, and thereby the correctness of the measurements increased to a heretofore unattained degree of accuracy without the addition of any new and sensitive parts.

The invention consists of a measuring tool in which the mandrel, instead of being of conically-tapering shape, is made in cylinders arranged step-shaped or in steps one next to the other, at that portion which is used for measuring the diameter of the objects, which cylinders differ in diameter but little, according to the degree of exactness required for the tool. In connection with the cylindrical steps of the measuring portion of the mandrel the graduation-lines of the scale formerly used on the scale-portion of the mandrel are now extended into cylinders or zones of more or less width, so that the reading off of the measurements, even with a slightly inaccurate adjustment of the index-point or reading-off edge, does not impair the accuracy of the measurements.

The accompanying drawing represents a vertical central section of one embodiment of my improved measuring tool, showing it as used for determining the diameter of a race in the guide-ring of a ball-bearing of any approved construction.

In the improved measuring tool contact-bodies are used, preferably the same steel-balls $c$ which are used in the ball-bearing itself. Three or more of these balls are inserted into the race $b$. Against the finished face $d$ of the ring $a$ is placed the face of a supporting frame $f$ having a guide-ring $g$ into which is inserted the cylindrical portion or shank $h^1$ of the axially-shiftable mandrel $m$, while the step-shaped measuring portion $h$ of the same is pushed through between the balls $c$, so that the latter are forced in outward direction and by the intimate contact of the balls $c$ with the race $b$ of the ring $a$ the free axial shifting of the mandrel is prevented. The edge $i$ on the rear face of the ring-shaped guide $g$ of the supporting frame $f$ forms then the edge for reading off the measure for the diameter of the race $b$.

According to the present invention the measuring portion $h$ of the mandrel, which is introduced between the balls $c$, is divided into a plurality of cylindrical steps $r^1$, $r^2$, $r^3$, $r^4$, $r^5$, the diameters of which differ little from each other, according to the degree of correctness required by the measurement, increasing, for instance, 0.01 mm. one from the other. When the race $b$ has, for instance, a diameter of 72.99 mm., then the balls $c$ form contact with the cylinder-step $r^4$, as shown in the drawing. The mandrel can, however, be shifted forward and backward for the width of the cylinder-step $r^4$ without changing the diametrical distance of the balls *c* as they ride on the cylindrical step of the mandrel. The cylindrical portion or shank $h^1$ of the mandrel is not provided with graduation-lines, but subdivided into graduating zones $s^1$, $s^2$, $s^3$, $s^4$, $s^5$ of the same width as the steps $r^1$ to $r^5$ of the cylinder $h$, and on these zones the measurements indicated by the steps of the measuring portion $h$ are placed in such manner as to be easily read off the graduated zones of the shank $h^1$, which forms the scale of the instrument.

As the numbers of the measurements are clearly placed on the graduated zones, they can be read off even under unfavorable conditions, that is, when by the least possible shifting of the mandrel the reading-off edge *i* should be slightly moved over the graduated zone $s^4$ or even on to the zone $s^5$. For this reason, as for example in the simple arrangement described, deviations up to 1 mm. and more of the distance of the race-center from the face *d* do not produce any noticeable error in the measurement of the race-diameter, even when carried out, for example, to an exactness or correctness of 1/100 of a millimeter.

In addition to the cylindrically-stepped portion $h$ of the mandrel, a conically-tapering end-portion *r* with a corresponding scale or zone *s* on the cylindrical portion or shank of the mandrel can be used for a preliminary measuring of the diameter.

It is advisable to support the balls *c*, which are used as the contact-bodies, in a cage *t* of the supporting frame *f*, so that these balls, while possessing a free play in lateral direction, are prevented from dropping out of the frame when the measuring instrument is not in use by the inwardly-projecting inner embracing edge of the cage *t*, which is of special importance, as they are thereby retained in position at the proper equal distance from each other around the step-shaped measuring portion $h$, that is to say, with three balls at an angle of 120° from each other.

I claim:

1. In a measuring tool for determining the internal diameter, a mandrel provided adjacent one end with a plurality of measuring cylinders, one adjacent the other, and adapted for measuring the diameter of the objects, each cylinder differing from its adjacent cylinder but little in diameter, said mandrel being also provided with a scale-portion adjacent the other end having graduations forming zones corresponding in width to the length of the measuring cylinders, and means supporting the balls to be measured, contacting with certain portions of the mandrel, and extending therefrom to corresponding portions of the scale portion.

2. A measuring tool, comprising a mandrel provided adjacent one end with a plurality of cylinders of different diameters and adapted for measuring the diameter of the objects, the cylinder of smallest diameter being at one end of the mandrel and each successive cylinder being slightly larger in diameter, said mandrel being provided with a guide or scale adjacent the other end of the mandrel having graduations, and a supporting frame provided at one end with contact-balls moving over the several measuring cylinders for determining the diameter of the object to be measured and having its other end extend over to the scale-portion and provided with means for reading off the measurements on the scale-portion.

3. In a measuring tool, the combination of a mandrel provided adjacent one end with a plurality of cylinders and adapted for measuring the diameter of the objects, the diameter of each successive cylinder varying from the diameter of the adjacent cylinder a very small amount, said mandrel being provided with a cylindrical guide or scale portion adjacent the other end of the mandrel, and having graduations forming zones equal in width to the length of the cylinders, a guide-frame provided at one end with a ring-shaped portion having contact-balls moving over the measuring cylinders, and a guide-ring connected with the guide-frame and extending around the scale-portion and provided with a reading-off edge.

In testimony, that I claim the foregoing as my invention, I have signed my name in presence of two subscribing witnesses.

CARL ALBERT HIRTH.

Witnesses:
PAULINE MÜLLER,
FRIDA KLAIBER.

Copies of this patent may be obtained for five cents each, by addressing the "Commissioner of Patents, Washington, D. C."